United States Patent [19]

Barda et al.

[11] Patent Number: 4,476,268

[45] Date of Patent: Oct. 9, 1984

[54] ACRYLONITRILE-BUTADIENE-STYRENE COMPOSITION CONTAINING HALOPHENOXYALKYLSILANE FLAME RETARDANT

[75] Inventors: Henry J. Barda, North Brunswick; Saadat Hussain, East Brunswick, both of N.J.

[73] Assignee: Ethyl Corporation, Richmond, Va.

[21] Appl. No.: 547,782

[22] Filed: Nov. 2, 1983

[51] Int. Cl.³ ............................................. C08L 9/02
[52] U.S. Cl. ................................. 524/265; 524/261; 524/267; 524/269
[58] Field of Search ................ 524/265, 261, 267, 269

[56] References Cited

U.S. PATENT DOCUMENTS

| 3,492,328 | 1/1970 | Kötzsch | 556/471 |
| 3,509,090 | 4/1970 | Miller | 524/263 |
| 3,546,267 | 12/1970 | Ismail | 556/471 |

OTHER PUBLICATIONS

Ismail et al., J. Organometal. Chem. vol. 10 (1967) pp. 421–426.

Primary Examiner—Maurice J. Welsh
Attorney, Agent, or Firm—Donald L. Johnson; John F. Sieberth; Teresa M. Stanek

[57] ABSTRACT

A flame retarded acrylonitrile-butadiene-styrene composition having improved Izod impact strength and improved light stability. The acrylonitrile-butadiene-styrene composition of the present invention contains a flame retardant amount of a halophenoxyalkylsilane. The preferred halophenoxyalkylsilane is bis-(2,4,6-tribromophenoxy)dimethylsilane. Antimony oxide may optionally be present.

4 Claims, No Drawings

ACRYLONITRILE-BUTADIENE-STYRENE COMPOSITION CONTAINING HALOPHENOXYALKYLSILANE FLAME RETARDANT

BACKGROUND OF THE INVENTION

1. Field of the Invention

The present invention relates to a flame retardant acrylonitrile-butadiene-styrene composition. More particularly, this invention relates to a flame retarded acrylonitrile-butadiene-styrene composition containing a flame retardant amount of a halophenoxyalkylsilane. Antimony oxide may optionally be present.

2. Description of the Prior Art

A variety of halophenoxyalkylsilanes are known to possess fire-retardant, fungicidal, phytotoxic, bactericidal and insecticidal properties. The preparation of these compounds have been reported in a number of U.S. patents and literature articles.

U.S. Pat. No. 3,492,328 teaches a process for the preparation of a halogenated tetraphenoxysilane of the formula

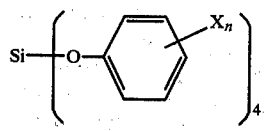

wherein X represents fluorine, chlorine or bromine and n is a whole number of from 3 to 5. U.S. Pat. No. 3,546,267 also teaches a process for the preparation of halogenated phenoxysilanes. Further techniques on the preparation of these types of compounds is discussed in "(Halophenoxy)silanes VIII" by Ismail and Koetzsch in *J. Organometal. Chem.*, 10 (1967) 421–426.

U.S. Pat. No. 3,509,090 claims the use of a wide variety of halogenated organosilane compounds as flame retardant additives in polycarbonate compositions. Examples 12 to 19 identify several other polymer systems where the halogenated organosilane compounds are effective flame retardants.

None of the above-identified references teach or suggest the use of any type of halogenated organosilane in acrylonitrile-butadiene-styrene (ABS). The present invention claims the use of a flame retarding amount of a halophenoxyalkylsilane in ABS. When a halophenoxyalkylsilane is incorporated in ABS in the presence of antimony oxide as a synergist, the resulting formulation is not only flame retarded but has a higher Izod impact strength than other flame retardants used in ABS. An additional advantage obtained while using halophenoxyalkylsilanes in acrylonitrile-butadiene-styrene compositions is an improved light stability. This is a favorable advantage over the prior art. The halophenoxyalkylsilane flame retardants also reduce the glow and increase char formation during burning yet retain good physical properties.

SUMMARY OF THE INVENTION

According to the present invention a flame retarded acrylonitrile-butadiene-styrene composition having improved Izod impact strength and improved light stability is obtained by the addition of a flame retarding amount of a halophenoxyalkylsilane to an acrylonitrile-butadiene-styrene composition.

DESCRIPTION OF THE PREFERRED EMBODIMENTS

The acrylonitrile-butadiene-styrene (ABS) composition of the present invention may have units other than ABS present in the polymer. A preferred polymer is a combination of acrylonitrile-butadiene-styrene with methylmethacrylate copolymerized therein. Typical polymers used to modify the ABS include modified styrene resins such as rubber modified polystyrenes, and the styrene containing copolymers such as the styrene-acrylonitrile copolymers, styrene-butadiene copolymers, styrene-acrylonitrile-α-alkyl styrene copolymers, poly- -methylstyrene, copolymers of ethylvinylbenzene and divinylbenzene, and the like. The preferred resin is unmodified acrylonitrile-butadiene-styrene.

To improve impact resistance, impact modifiers are added to the composition of this invention. Specific examples of impact modifiers are ethylene-vinyl acetate copolymers, ethylene-acrylic acid copolymers (having some of the acid functions neutralized), ethylene-methacrylic acid copolymers (having some of the methacrylic acid functions neutralized), ethylene-alkyl acrylate-methacrylic acid terpolymer (also having some of the methacrylic acid functions neutralized), methyl methacrylate grafted polybutadiene, methyl methacrylate grafted poly(alkyl acrylates), methyl methacrylate-styrene grafted rubbers, oxidized polyethylene, styrene-butadiene-styrene (S—B—S) block copolymers, styrene-butadiene multiblock copolymers, styrene-butadiene radial block copolymers, hydrogenated S—B—S block copolymers, styrene-butadiene rubber, terpolymers of ethylene, vinyl acetate and glycidyl methacrylate, copolymers of ethylene and glycidyl methacrylate, block copolymers of butadiene, styrene, and caprolactone, acrylic rubbers, EPDM, ethylene-acrylic acid copolymers, ethylene-methyl acrylate copolymers, ethylene-ethyl acrylate copolymers, polyester-ether multiblock copolymers such as copolymers of butylene glycol, polytetramethylene ether glycol and terephthalic acid, aliphatic esters such as poly(ethylene adipate), polycarbonate and the like. Amounts of impact modifiers generally fall within the range of from about 5 to about 25 parts per hundred parts of acrylonitrile-butadiene-styrene.

The halophenoxyalkylsilanes of the present invention may be described by the following formula:

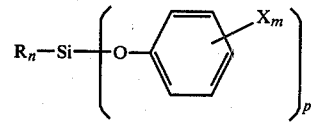

wherein R is selected from the group consisting of straight chain alkyl groups, branched alkyl groups and cycloalkyl groups having from 1 to 10 carbon atoms, X is a halogen selected from the group consisting of chlorine and bromine, n is an integer from 0 to 3, p is an integer from 1 to 4 and m is an integer from 1 to 5.

Preferably, X is bromine and m is an integer from 3 to 5. More preferably, X is bromine and m is 3. Preferably, R is a straight chain or branched alkyl having from 1 to 5 carbon atoms, more preferably, R is methyl or ethyl. The most preferred R is methyl. Preferably, n is the integer 1 or 2 and p is the integer 2 or 3. More preferably, both n and p are 2. The most preferred halophenoxyalkylsilane intended in the practice of the present invention is bis-(2,4,6-tribromophenoxy)dimethylsilane and is represented by the formula:

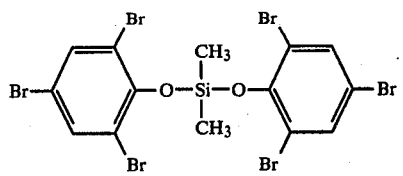

The halophenoxyalkylsilane flame retardants of the present invention are present in a sufficient quantity to impart flame retardant properties to the acrylonitrile-butadiene-styrene composition. Generally, quantities of from about 0.1 wt % to about 25 wt % based on the weight of the acrylonitrile-butadiene-styrene are sufficient to render acrylonitrile-butadiene-styrene compositions flame retarded and resistant to thermal degradation. Preferably, from about 5 wt % to about 25 wt % of the halophenoxyalkylsilane is used. More preferably, the amount of the flame retardant additive ranges from about 10 wt % to about 20 wt %.

An additional compound that may be added to the acrylonitrile-butadiene composition containing a halophenoxyalkylsilane flame retardant is antimony oxide. Antimony oxide is a well known flame retardant synergist. Antimony oxide exhibits synergistic effects only with halogen compounds. Antimony oxide is stable and can be blended at normal processing temperatures. There are at least three known oxides of antimony that are known for their synergistic effects. These include $Sb_2O_3$, $Sb_2O_4$ and $Sb_2O_5$. The most commonly used form of antimony oxide is $Sb_2O_3$.

The useful concentration of antimony oxide varies over a wide range. The optimum amount of antimony oxide to be used depends not only on the specific halogen, such as bromine or chlorine, but also on the type of halophenoxyalkylsilane selected. Antimony oxide is normally employed in a concentration of about 0.1 wt % to about 15 wt %, based on the weight of the acrylonitrile-butadiene-styrene composition. Preferably, the concentration of the antimony oxide is in the range of about 1 wt % to about 10 wt % and more preferably, about 3 wt % to about 6 wt %.

Other types of flame retardant synergists may also be present. These may include free radical generating compounds such as dicumyl peroxide, a conventional metal compound synergist, or an aliphatic or cycloaliphatic phosphite or thiophosphite. It is to be understood that the composition of this invention can have the usual fillers, dyes, pigments, plasticizers, antistatic agents, stabilizing agents, and the like incorporated therein, if desired. These compounds are well-known in the art.

There is no definite upper limit for the amount of total additives to be incorporated in the acrylonitrile-butadiene-styrene composition. Ordinarily, additives are used at the lowest level which will produce the least change in physical properties of the ABS. The halophenoxyalkylsilanes of the present invention are especially effective in maintaining good physical properties. A high Izod impact strength and improved light stability results.

The production of the flame retardant composition of the present invention can be carried out in various manners. For example, mixtures of the acrylonitrile-butadiene-styrene compositions can be prepared by mixing the halophenoxyalkylsilane flame retardant with antimony oxide and other optional additives into the high impact polystyrene at an elevated temperature in an extrusion press or a kneader such as a Banbury mixer. The components can also be dissolved in a common solvent. The solution can be admixed with the polymer and then the solvent recovered. In the case of granular or bead-like plastic compositions, the surface of the granule may be coated.

The invention is demonstrated in the following examples, but it is to be understood that the invention is not limited to these specific examples.

EXAMPLE 1

Preparation of Bis-(2,4,6-tribromophenoxy)dimethylsilane

A 500 ml resin kettle equipped with a mechanical stirrer, a reflux condenser and a nitrogen flush assembly, was charged with 2,4,6-tribromophenol (132.2 1 g, 0.4 mole) and toluene (350 ml). The contents were heated and stirred under nitrogen to 45° C. A tan colored solution was obtained. All the remaining operations were performed under a continuous flow of nitrogen. When the clear solution was obtained at 45° C., N,N-dimethylaniline (5.0 ml) was added in three portions over a period of about ten minutes. The contents were heated to 50° C. and then dichlorodimethylsilane (25.8 g, 0.2 mole) was added dropwise over a period of 10–12 minutes and the pot temperature was allowed to rise slowly to 75°–80° C. at which time another 5.0 ml of N,N-dimethylaniline was introduced. When all the base had been added, heating was continued until the contents began to reflux at 110° C. After a total of 11 hours of reflux under nitrogen, the contents were brought down to room temperature and stripped of the solvent on the rotary evaporator followed by dilution with 300 ml of hexane, and stored under nitrogen at −5° C. overnight. The light gray product thus deposited was re-crystallized twice from toluene to give colorless crystals weighing 75.2 g (52.2% yield). The melting point was found to be 124°–130° C. The identity of the compound was confirmed by elemental analysis which gave the following results. Calculated for $C_{14} H_{10} O_2 Br_6 Si$: C=23.42%, H=1.40%, Br=66.79%, Si=3.91%. Found: C=23.95%, H=1.47%, Br=66.45%, Si=3.99%.

EXAMPLE 2

Evaluation of ABS Composition

The bis-(2,4,6-tribromophenoxy)dimethylsilane prepared in Example 1 was mixed with ABS T-1000 which is acrylonitrile-butadiene-styrene produced by Borg-Warner. Antimony oxide was also added. The three components were mixed in a Brabender mixer at a temperature of 365° F. for ten minutes. The mixture was compression molded into plaques, cooled and cut into specimens for testing.

A comparison was conducted by replacing the flame retardant of Example 1 with octabromodiphenyl ether or Firemaster 680 which is 1,2-bis-(tribromophenoxy)ethane produced by Great Lakes Chemical Company. The fourth sample represented pure ABS T-1000 without a flame retardant component.

Table 1 contains the results of these tests. The quantities of ingredients as listed in Table 1 represent weight percent based on the weight of the ABS. The percent of the bromine in each sample was calculated. Several other tests were conducted on the samples.

The Oxygen Index Test is defined as the minimal volume fraction of oxygen in a slowly rising oxygen-nitrogen atmosphere that will maintain the candlelike burning of a stick of polymer. The higher the Oxygen Index of a molded article, the more flame retardant it is.

The UL-94 vertical burn test is used to classify polymer specimens as V-0, V-1, V-2 and burn. Polymer specimens are held vertically and ignited at the bottom. Classification is based on burn times, the presence or absence of flaming drip and the presence and extent of afterglow. The Izod impact test was conducted as described in ASTM D 256. A notch was cut in the narrow face of a ⅛"×½"×2" specimen. This notch was made following procedure A of ASTM D 618. The Izod impact strength indicates the energy that is required to break notched specimens under standard conditions. The Izod impact strength is calculated as ft.lb./in. of notch. The light stability was determined by exposing each plaque to U.V. light for a period of four hours. A high number represents poor stability.

TABLE 1

| Evaluation of ABS Composition | Sample | | | |
|---|---|---|---|---|
| | 1 | 2 | 3 | 4 |
| ABS T-1000 | 77 | 82 | 79 | 100 |
| Flame Retardant from Ex. 1 | 20 | — | — | — |
| Octabromodiphenyl ether | — | 15 | — | — |
| Firemaster 680 | — | — | 18 | — |
| Antimony Oxide | 3 | 3 | 3 | — |
| % Bromine in the Formulation | 13.35 | 11.96 | 12.55 | — |
| Oxygen Index | 34.5 | 29.3 | 25.8 | 18.5 |
| UL-94 (⅛") | V-0 | V-0 | V-0 | Burn |
| Izod impact (⅛") | 3.2 | 2.16 | 1.21 | 5.70 |
| Light Stability (4 hours exposure) | 2 | 4 | 2 | 1 |

Glow was not observed during the Oxygen Index testing of the formulation containing the bis-(2,4,6-tribromophenoxy)dimethylsilane. As indicated by Table 1, the acrylonitrile-butadiene-styrene formulation containing the bis-(2,4,6-tribromophenoxy)dimethylsilane had good flame retardant properties and good physical properties unlike the other samples.

We claim:

1. A flame retarded acrylonitrile-butadiene-styrene composition having improved Izod impact strength and improved light stability which comprises an acrylonitrile-butadiene-styrene composition containing a flame retarding amount of a halophenoxyalkylsilane.

2. The flame retarded acrylonitrile-butadiene-styrene composition as recited in claim 1 containing antimony oxide.

3. The flame retarded acrylonitrile-butadiene-styrene composition as recited in claim 1 wherein said halophenoxyalkylsilane is bis-(2,4,6-tribromophenoxy)dimethylsilane.

4. The flame retarded acrylonitrile-butadiene-styrene composition as recited in claim 1 wherein said halophenoxysilane is present at a concentration of from about 0.01 wt % to about 25 wt % based on the weight of the acrylonitrile-butadiene-styrene.

* * * * *